United States Patent [19]
Van et al.

[11] Patent Number: 5,707,754
[45] Date of Patent: Jan. 13, 1998

[54] MAGNETIC RECORDING MEDIUM AND THERMAL RECORDING PRINTING DEVICE ADOPTING THE SAME

[75] Inventors: Kazuo Van, Nara; Hitoshi Isono, Tenri, both of Japan

[73] Assignee: Sharp Kabushiki Kaisha, Osaka, Japan

[21] Appl. No.: 587,540

[22] Filed: Jan. 17, 1996

[30] Foreign Application Priority Data

Jan. 26, 1995 [JP] Japan ................................. 7-010986

[51] Int. Cl.$^6$ ............................................ G11B 5/64
[52] U.S. Cl. ...................... 428/611; 428/216; 428/336; 428/660; 428/662; 428/668; 428/694 RE; 428/694 TS; 428/900
[58] Field of Search ...................... 148/301; 420/435; 428/694 RE, 900, 336, 216, 611, 660, 662, 668, 694 TS

[56] References Cited

U.S. PATENT DOCUMENTS

| | | | |
|---|---|---|---|
| 4,126,494 | 11/1978 | Imamura et al. | 148/31.57 |
| 5,158,834 | 10/1992 | Funkenbusch | 428/694 |

FOREIGN PATENT DOCUMENTS

| | | |
|---|---|---|
| 56-161572 | 12/1981 | Japan . |
| 56-161573 | 12/1981 | Japan . |
| 56-161574 | 12/1981 | Japan . |
| 57-136673 | 8/1982 | Japan . |
| 59-071076 | 4/1984 | Japan . |
| 60-054863 | 3/1985 | Japan . |
| 61-20077 | 1/1986 | Japan . |
| 61-20078 | 1/1986 | Japan . |
| 62-100767 | 5/1987 | Japan . |
| 63-142361 | 6/1988 | Japan . |
| 1-046766 | 2/1989 | Japan . |
| 3-154067 | 7/1991 | Japan . |

OTHER PUBLICATIONS

S. Imamura et al., "Recording and Developing Characteristics in Magnetography by Optical Writing," in *Electrophotography (The Society Journal)*, vol. 24, No. 4, pp. 14–20 (1985).

N. Kokaji, "A Theoretical Analysis of the Magnet Force Acting on the Magnetic Toner from the Magnetic Latent Image," *Electrophotograhy (The Society Journal)*, vol. 29, No. 3, pp. 265–275 (1990).

*Primary Examiner*—Stevan A. Resan
*Attorney, Agent, or Firm*—David C. Conlin; Milton Oliver

[57] ABSTRACT

A thermomagnetic printer of the in-plane magnetization system includes a magnetic recording layer made of $Dy_xCo_{(1-x)}$ or $Dy_yCo_{(1-y)}$ and a base layer made of Ti or Ta. Since the described arrangement enables the magnetic recording layer to be formed by the sputtering method or the electron beam evaporation method, and the like, the magnetic recording layer having a uniform thickness and properties in a large area can be formed without difficulties. In addition, by adopting the Ti layer or the Ta layer as the base layer, a reduction in a residual magnetization can be prevented even when the magnetic recording layer is made thicker, thereby increasing a magnetic attraction force.

12 Claims, 12 Drawing Sheets ns a direction perpendicular to the medium as shown in FIG. 13(b).

MAGNETIC RECORDING MEDIUM AND THERMAL RECORDING PRINTING DEVICE ADOPTING THE SAME

FIELD OF THE INVENTION

The present invention relates to a magnetic recording medium for forming thereon a magnetic latent image by recording an in-plane magnetization by a thermomagnetic recording system and also relates a thermomagnetic printing device adopting the same.

BACKGROUND OF THE INVENTION

In the magnetic printing system which is generally referred to as "magnetography", a magnetic latent image formed on a magnetic recording layer is made into a visible image using a magnetic toner, and the resulting visible image is copied to a recording material. Then, the visible image is fixed thereon to obtain a hard copy.

For example, (1) Japanese Laid-Open Patent Publication No. 54863/1985 (Tokukaisho 60-54863) and (2) Japanese Laid-Open Patent Publication No. 154067/1991 (Tokukaihei 3-154067) disclose thermomagnetic printers which adopt the below-mentioned thermomagnetic recording system as a type of the above-mentioned magnetic printing system. In the thermomagnetic recording system, a magnetic layer is heated to apply a magnetic field, thereby forming a magnetic latent image on the magnetic recording layer.

FIG. 11 and FIG. 12 are typical depictions schematically showing the thermomagnetic printers of the Gazettes (1) and (2). The thermomagnetic printers shown in FIG. 11 and FIG. 12 have the same configuration except that as a magnetic latent image holding member in which a magnetic recording layer 11 is formed, a magnetic belt 8 is adopted in the former, while a magnetic drum 9 is adopted in the latter, and there is no difference in basic operation between the two printers. Therefore, in the following, operations of the thermomagnetic printer will be briefly explained with regard to only the printer shown in FIG. 12. In FIG. 11 and FIG. 12, members having the same functions will be designated by the same reference numerals for convenience in explanations.

As shown in FIG. 12, the thermomagnetic printer includes a magnetic drum 9, a developing device 12, a transfer roller 14, an external magnetic field application-use magnet 15, a magnet 16, a cleaning unit 17 and a thermal head device 18. The magnetic drum 9 is provided for forming a magnetic recording layer 11 on a surface of a drum base 9a. The magnetic recording layer 11 features such that its coercive force is lowered as temperature rises. The developing device 12 is provided for visualizing a magnetic latent image using a magnetic toner 10. The transfer roller 14 is provided for copying a toner image formed on the magnetic recording layer 11 to a recording material 19. The external magnetic field application-use magnet 15 is provided for externally applying a magnetic field to the magnetic recording layer 11. The magnet 16 is provided for arranging a magnetization direction in the magnetic recording layer 11 in one direction. The cleaning unit 17 is provided for removing the magnetic toner 10 remaining on the surface of the magnetic drum 9. The thermal head device 18 is provided for raising the temperature of the magnetic recording layer 11. In the described arrangement, transfer operations of the thermomagnetic printer will be explained below.

(a) After being initialized by the magnet 16, the magnetic recording layer 11 is heated to a predetermined temperature by the thermal head device 18 and the below-mentioned external magnetic field is applied thereto by the external magnetic field application-use magnet 15. The external magnetic field has a direction opposite to the initialization direction. The external magnetic field is not greater than the coercive force of the magnetic recording layer 11 at room temperature but becomes greater when the magnetic recording layer 11 is heated to the above-mentioned predetermined temperature. In the described manner, a magnetic latent image having an inverse magnetization direction is formed on the magnetic recording layer 11.

(b) In the developing device 12, the magnetic latent image formed on the magnetic recording layer 11 is formed into a visible image using the magnetic toner 10.

(c) Then, the visible image thus formed is copied to the recording material 19 by the transfer roller 14. Here, the magnetic toner 10 remaining on the surface of the magnetic drum 9 without being transferred to the recording material 19 is removed by the cleaning unit 17.

In the case of continuously forming another magnetic latent image, the above-mentioned processes (a)–(c) are repeated. In addition, by repeating the above-mentioned processes (a)–(c) without performing an initialization process of the magnetic recording layer 11, a so-called multiple copying operation can be performed.

The described method of forming the magnetic latent image can be classified by the magnetization direction into two systems: the in-plane magnetization system and the perpendicular magnetization system. Specifically, the in-plane magnetization has a direction parallel to the medium as shown in FIG. 13(a), while the perpendicular magnetization has a direction perpendicular to the medium as shown in FIG. 13(b).

The report from the Institution of Electrophotography of Japan (P. 17, Vol. 24, No. 4, 1985) teaches superiorities of the in-plane magnetization system to the perpendicular magnetization system when adopting it in the thermomagnetic printer. That is, when recording on a magnetic recording medium, in general, a recording magnetic field is reduced by a demagnetizing field generated in a recording area. However, in the case of recording with a width in a range of 10–200 µm on a recording film with a normal thickness (1–5 µm), the in-plane magnetization system is superior to the perpendicular magnetization system in its recording efficiency as in the in-plane magnetization system, a smaller demagnetizing field is generated which offers a greater recording magnetic field as compared to the perpendicular magnetization system. Also in the case of recording by, first, performing the above-mentioned initialization operation to arrange the magnetization direction in one direction and then recording a latent image by forming a magnetization area having an opposite direction to the initialization magnetization direction, the in-plane magnetization system is superior to the perpendicular magnetization system as it generates a greater magnetic attraction force with respect to the magnetic toner. For the reasons set forth above, the in-plane magnetization method is suited as the recording method for the thermomagnetic printer.

The following properties are required for the magnetic recording medium to be adopted in the thermomagnetic printer.

(1) A magnetic attraction force is large (high contrast); and (2) A coercive force is large (stability of the recorded information).

In addition, to achieve a reduction in power consumption and high speed printing, a still larger reduction in coercive force with a temperature rise is required.

With regard to the in-plane magnetic recording system, as shown in FIG. 10, for example, the magnetic attraction force exerted on the magnetic toner which is about 10 μm away from the surface of the magnetic recording medium becomes greater as the product of the residual magnetization and the film thickness of the magnetic recording medium becomes larger (see report from the Institute of Electrophotography of Japan, P. 19, Vol. 29, 1990).

Examples of conventional materials for use as a magnetic recording medium designed for the in-plane magnetization system include: $CrO_2$ as disclosed by (3) Japanese Laid-Open Patent Publication No. 161572/1981 (Tokukaisho 56-161572), (4) Japanese Laid-Open Patent Publication No. 161573/1981 (Tokukaisho 56-161573), (5) Japanese Laid-Open Patent Publication No. 161574/1981 (Tokukaisho 56-161574), and (6) Japanese Laid-Open Patent Publication No. 71076/1984 (Tokukaisho 59-71076). As another conventional example, a recording medium including $Ne_nN$ is disclosed by (7) Japanese Laid-Open Patent Publication No. 20077/1986 (Tokukaisho 61-20077) and (8) Japanese Laid-Open Patent Publication No. 20078/1986 (Tokukaisho 61-20078).

In the Gazettes (3), (4) and (5), $CrO_2$ is formed on a sheet-like base film, while in the Gazette (6), $CrO_2$ is applied with a binder on a polyimide film.

In the Gazettes (7) and (8), $Ne_nN$ is applied by dispersing it in a high molecular resin binding agent such as polyurethane, polyimide, and the like so as to have a thickness of 5–30 μm to a base substrate with a thickness of 50–150 μm made of polyethylene telephtalate, polyimide, and the like.

However, in adopting $CrO_2$, the virulence of its component Cr has been pointed out. Therefore, in view of the environmental problem, the use of such $CrO_2$ should be stubbornly avoided, and in fact $CrO_2$ is difficult to be obtained nowadays.

On the other hand, $Fe_nN$ which contains iron is likely to be oxidized. Furthermore, as the thermomagnetic printer is disposed in an air at high temperature, when using the printer for a long period time, such oxidization would cause the deterioration of the properties.

In forming a film from $CrO_2$ or $Fe_nN$, $CrO_2$ or $Fe_nN$ is basically dispersed in a high-molecular resin dissolved in a solvent to be applied on a drum base, film sheet, and the like. However, such method has the following defects.

First, due to a deviation in distribution of $CrO_2$ or $Fe_nN$ in a resin, variations in properties of the magneto-optical recording medium is likely to occur. Moreover, the dispersed state of $CrO_2$ or $Fe_nN$ is difficult to be controlled.

When recording by the thermal head, to ensure a uniformity of the magnetic latent image formed on the magnetic recording medium, adhesion between a head and a medium is strongly demanded. However, in the process of evaporating the solvent, the medium becomes uneven in its thickness unless the evaporation rate is strictly controlled, thereby presenting the problem that the film thickness is difficult to be controlled to be uniform in a large area.

To overcome such defects, it has been proposed to adopt the sputtering method or the electron beam evaporation method as a film forming method. However, as the beneficial properties of $CrO_2$ or $Fe_nN$ are shown in a film having $CrO_2$ or $Fe_nN$ dispersed in the high molecular resin applied thereto, when forming a film by the sputtering method or the electron beam evaporation method, it is difficult to ensure such beneficial properties.

Additionally, when adopting the below-listed materials, the formation of the magnetic recording layer by the sputtering method is permitted. However, such materials are for the perpendicular magnetization system, and cannot be applied directly to the in-plane magnetization method. Examples of such material include: NdDyCo and NdDyCo to which an element such as Ti, Al, Cu, Cr, and the like is added as disclosed in Japanese Laid-Open Patent Publication No. 100767/1987 (Tokukaisho 62-100767), Japanese Laid-Open Patent Publication No. 142361/1988 (Tokukaisho 63-142361), and Japanese Laid-Open Patent Publication No. 46766/1989 (Tokukaisho 64-46766); an amorphous magnetic substance composed of a rare earth metal and a transition metal, such as GdCo, TbFe, GdFe, DyTb, (GdTb)Fe, (GdTb)Co, $TbFeO_3$, HoCo, DyFe, GdCoMo and the like, as disclosed in Japanese Laid-Open Patent Publication No. 136673/1982 (Tokukaisho 57-136673).

Additionally, to achieve improved performances of the thermomagnetic printer, it is required to improve the above-mentioned properties. Specifically, among the magnetic recording media adopting the same material, to increase the magnetic attraction force, those having thicker films are preferable. However, in the case of the in-plane magnetization film adopting the conventional magnetic recording medium, when increasing the film thickness, the problem would arise in that the residual magnetization and the magnetic attraction force would be reduced.

SUMMARY OF THE INVENTION

The first object of the present invention is to provide a magnetic recording medium for recording thereon an in-plane magnetization, which enables a high resolution and high contrast magnetic latent image to be formed and also enables a film having a uniform thickness in a large area to be formed by the sputtering method or the electron beam evaporation method.

To achieve the first object, the magnetic recording medium in accordance with the present invention is made of an amorphous alloy thin film of a formula $Dy_xCo_{(1-x)}$ or $Tb_yCo_{(1-y)}$.

According to the described structure, DyCo or TbCo of a predetermined composition is used in the in-plane magnetization system, and a film can be formed by the sputtering method or the electron beam evaporation method.

As a result, a magnetic recording medium of a large area for the in-plane magnetization system having uniform film thickness and properties can be formed. The magnetic recording medium is composed of Dy and Co, or Tb and Co, and a control for achieving the magnetic recording medium having specific properties can be easily performed, thereby ensuring the magnetic recording medium having uniform properties in a stable condition.

The second object of the present invention is to provide a thermomagnetic printing device which permits a reduction in residual magnetization to be suppressed and which permits the magnetic attraction force to be increased even when the film of the magnetic recording medium is made thicker.

To achieve the second object, the thermomagnetic printing device in accordance with the present invention is arranged such that an amorphous alloy thin film of a formula $Dy_xCo_{(1-x)}$ or $Tb_yCo_{(1-y)}$ is used in the magnetic recording medium, and a Ta layer or a Ti layer is formed as a base layer between the magnetic recording medium and the base having the magnetic recording medium formed on the surface thereof.

According to the described arrangement, such Ta layer and Ti layer enables the reduced amount of the residual magnetization to be suppressed even when the film of the magnetic recording medium is made thicker. Additionally, since both the Ta layer and the Ti layer have their thermal conductivities smaller than that of the base, heat is not likely to be released to the substrate, and the amount of heat released from the side of the substrate can be reduced.

As the described structure enables a greater magnetic attraction force, the thermomagnetic printing device of the present invention having such structure offers an image of high resolution and high contrast. Additionally, since the Ta layer and Ti layer permit an amount of heat released from the substrate to be reduced, the heat absorbed in the magneto-optical recording medium can be effectively kept therein, and the time required for heating the medium to a predetermined temperature can be shortened. As a result, the thermomagnetic printing device of the present invention permits a high speed recording and a smaller power consumption by shortening the heating time.

For a fuller understanding of the nature and advantages of the invention, reference should be made to the ensuing detailed description taken in conjunction with the accompanying drawings.

DESCRIPTION OF THE EMBODIMENTS

The following will discuss the configuration of a thermomagnetic printer adopted in below-mentioned preferred embodiments in reference to FIG. 1, FIG. 11 and FIG. 12.

Figure 1A:
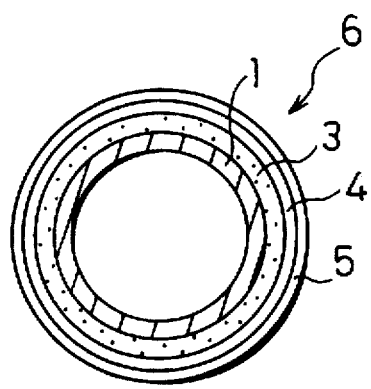
FIG. 1(a) is a cross-sectional view showing a schematic configuration of a drum-shaped magnetic latent image holding member.
Figure 12:
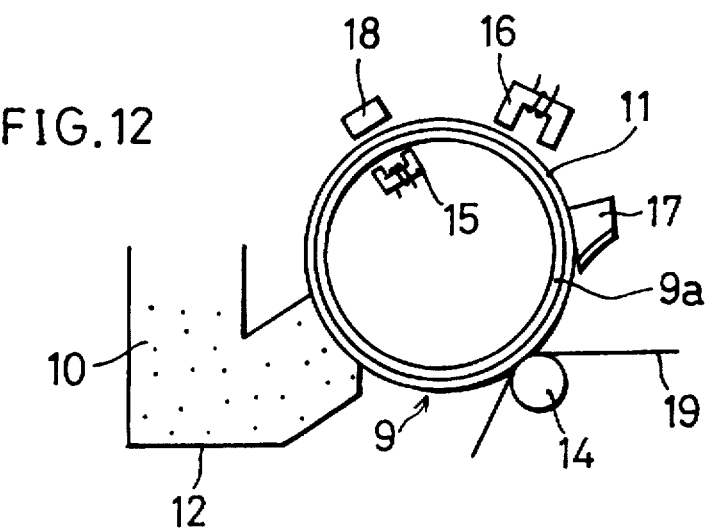
FIG. 12 is a typical depiction showing a schematic configuration of another thermomagnetic printer used in common in conventional examples and embodiments of the present invention.
Figure 13A:
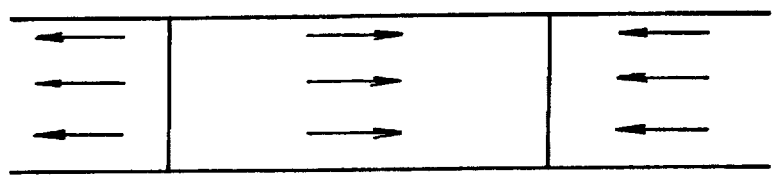
FIG. 13(a) is an explanatory view showing an in-plane magnetization direction in a magnetic recording medium.
Figure 13B:
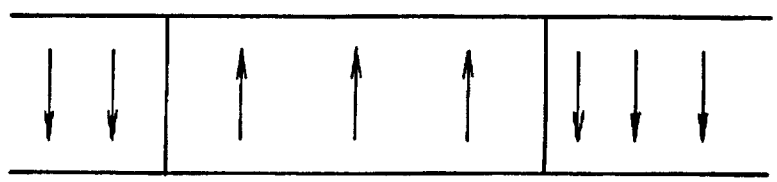
FIG. 13(b) is an explanatory view showing a perpendicular magnetization direction in a magnetic recording medium.

The thermomagnetic printer of the present invention includes a magnetic drum 9 shown in FIG. 12 composed of a magnetic latent image holding member 6 shown in FIG. 1(a). The magnetic latent image holding member 6 includes a base layer 3, a magnetic recording layer 4 and a protective film 5 which are laminated in this order on a drum base 1 made of Al.

The base layer 3 is made of Ta or Ti. The magnetic recording layer 4 is composed of a DyCo film or TbCo film having a predetermined composition. Such base layer 3 and the magnetic recording layer 4 are formed by the sputtering method and the electron beam evaporation method.

It is preferable that the magnetic recording layer 4 has a film thickness in a range of 0.1–1 μm for the following reason. If the layer is too thin, by the effect of Al, the thermal conductivity would be lowered, and heat cannot be kept in the magnetic recording layer 4 effectively. On the other hand, if the layer 3 is thicker than the above-mentioned range, a long time would be required for the film forming process, thereby presenting the problem of cost increase.

It is preferable that the base layer 3 has a film thickness in a range of 0.5–2 μm for the following reason. Although the magnetic attraction force becomes larger as the film becomes thicker, if the film becomes too thick, the value of the residual magnetization would be lowered due to the shape anisotrophy.

The protective film 5 is made of nitride such as AlN, TiN, or the like in consideration of hardwearing properties and environmental resistance because in the case of recording using the thermal head device 18, the thermal head and the surface of the magnetic latent image holding member 6 contact with one another. Therefore, in the case of performing a heating operation using a laser beam, etc., without making such contact, the protective film 5 is not necessarily required.

In the arrangement of the conventional thermomagnetic printer shown in FIG. 12, a magnetic belt 8 may be used as the magnetic latent image holding member 6. For the magnetic belt 8, a belt 8a that is a film sheet made of a high molecular weight material such as polyimide, polyethylene terephthalate, and the like, is used. In this case, it is preferable that the base layer 3 has a film thickness in a range of 0.1–1 μm in view of environmental resistance with respect to permeability of oxygen in the film sheet in addition to the above-mentioned reason.

Figure 1B:
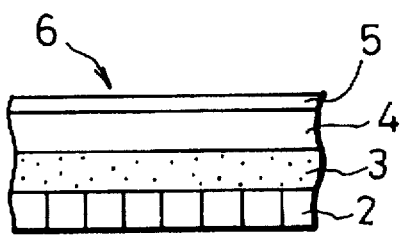
FIG. 1(b) is a cross-sectional view showing a schematic configuration of a magnetic latent image holding member having a glass substrate as a base.
Figure 1C:
FIG. 1(c) is a cross-sectional view showing a schematic configuration of a magnetic latent image holding member which does not include a base layer in the magnetic latent image holding member shown in FIG. 1(b).

To select the composition of the magnetic recording layer 4 to be adopted in the thermomagnetic printer, a magnetic latent image holding member including the base layer 3, the magnetic recording layer 4 and the protective film 5 which are laminated in this order on the glass substrate 2 as shown in FIG. 1(b) and a magnetic latent image holding member including the magnetic recording layer 4 and the protective film 5 which are laminated in this order on the glass substrate 2 as shown in FIG. 1(c) were prepared as samples of the magnetic latent image holding member 6, and experiments were conducted using the samples.

The glass substrate 2 used in the below-mentioned Example 1 through Example 12 is available from Coaning Co., Ltd. The magnetic toner 10 is available from Hitachi Metal Co., Ltd. (H700, with magnetic powder content of 70 percent and an average particle diameter of 12.2 μm).

[EMBODIMENT 1]

The following will discuss one embodiment of the present invention in reference to FIG. 1 through FIG. 4.

In this embodiment, magnetic recording layers 4 made of amorphous alloy thin films with a thickness of 0.7 μm were respectively formed on the following three kinds of samples: two samples respectively including Ta with a thickness of 0.5 μm and Ti with a thickness of 0.4 μm as the base layer 3 formed on the glass substrate 2 (shown in FIG. 1(b) and a sample composed of only the glass substrate 2 (shown in FIG. 1(c)). The magnetic recording layer 4 is formed by the high frequency sputtering method using a sample wherein Dy chips were arranged so as to have a predetermined composition on the surface of the Co target without applying a bias magnetic field.

Figure 2:
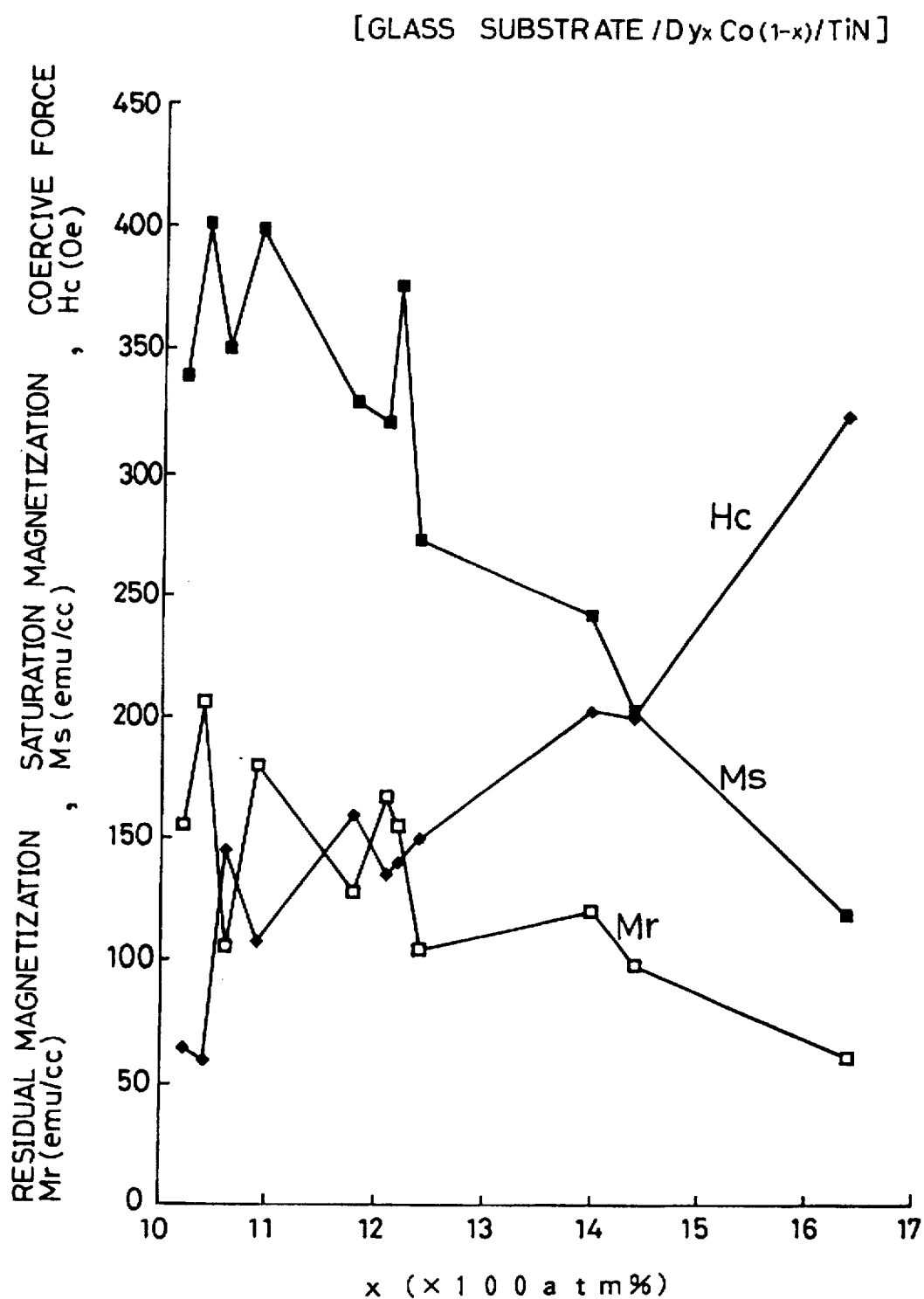
FIG. 2 is a graph showing a change in magnetic properties by Dy composition x in the magnetic latent image holding member of FIG. 1(c) having a structure of [glass substrate/$Dy_xCo_{(1-x)}$/TiN].
Figure 3:
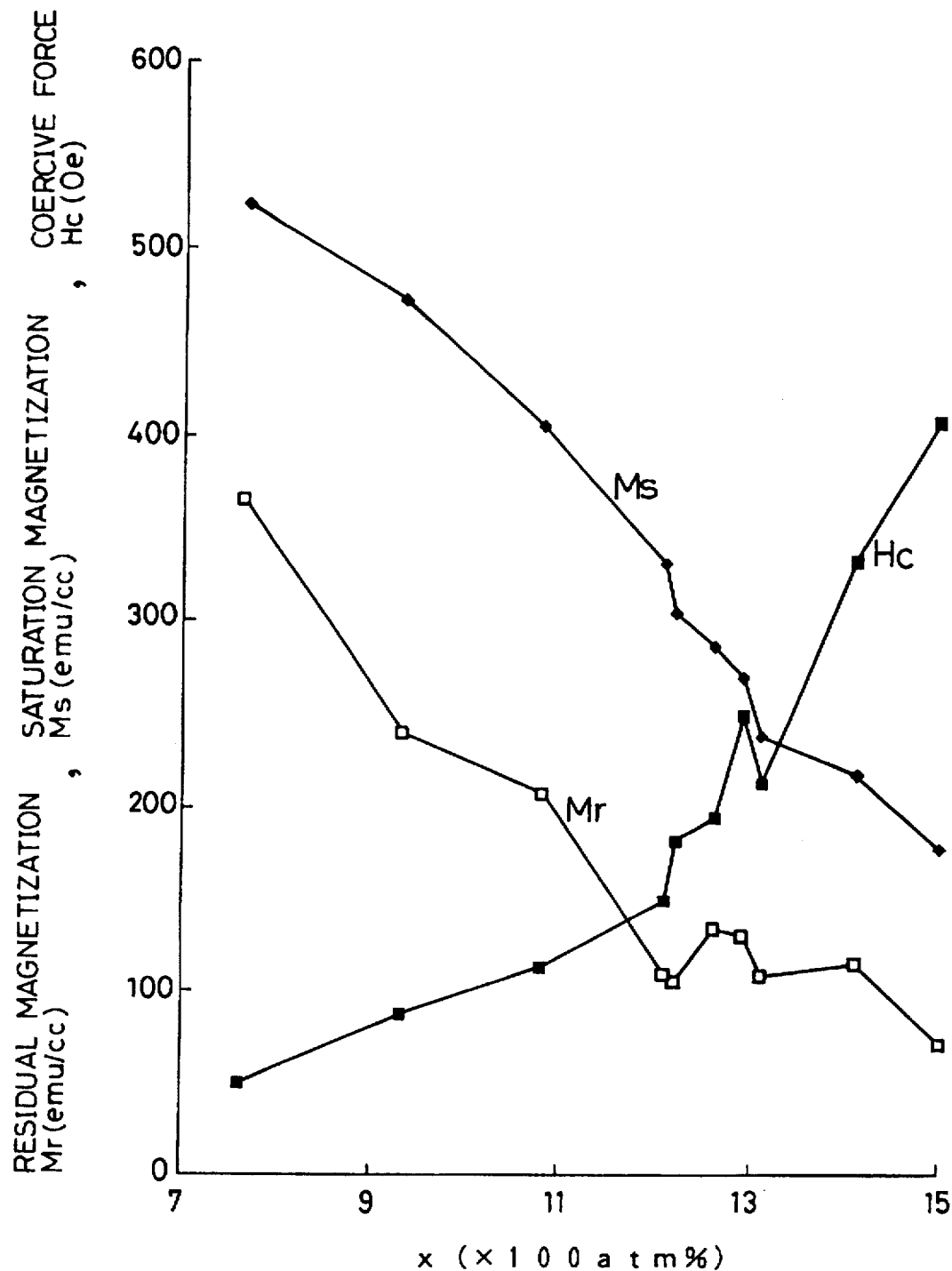
FIG. 3 is a graph showing a change in magnetic properties by Dy composition x in the magnetic latent image holding member having a structure of [glass substrate/Ta/$Dy_xCo_{(1-x)}$/TiN].
Figure 4:
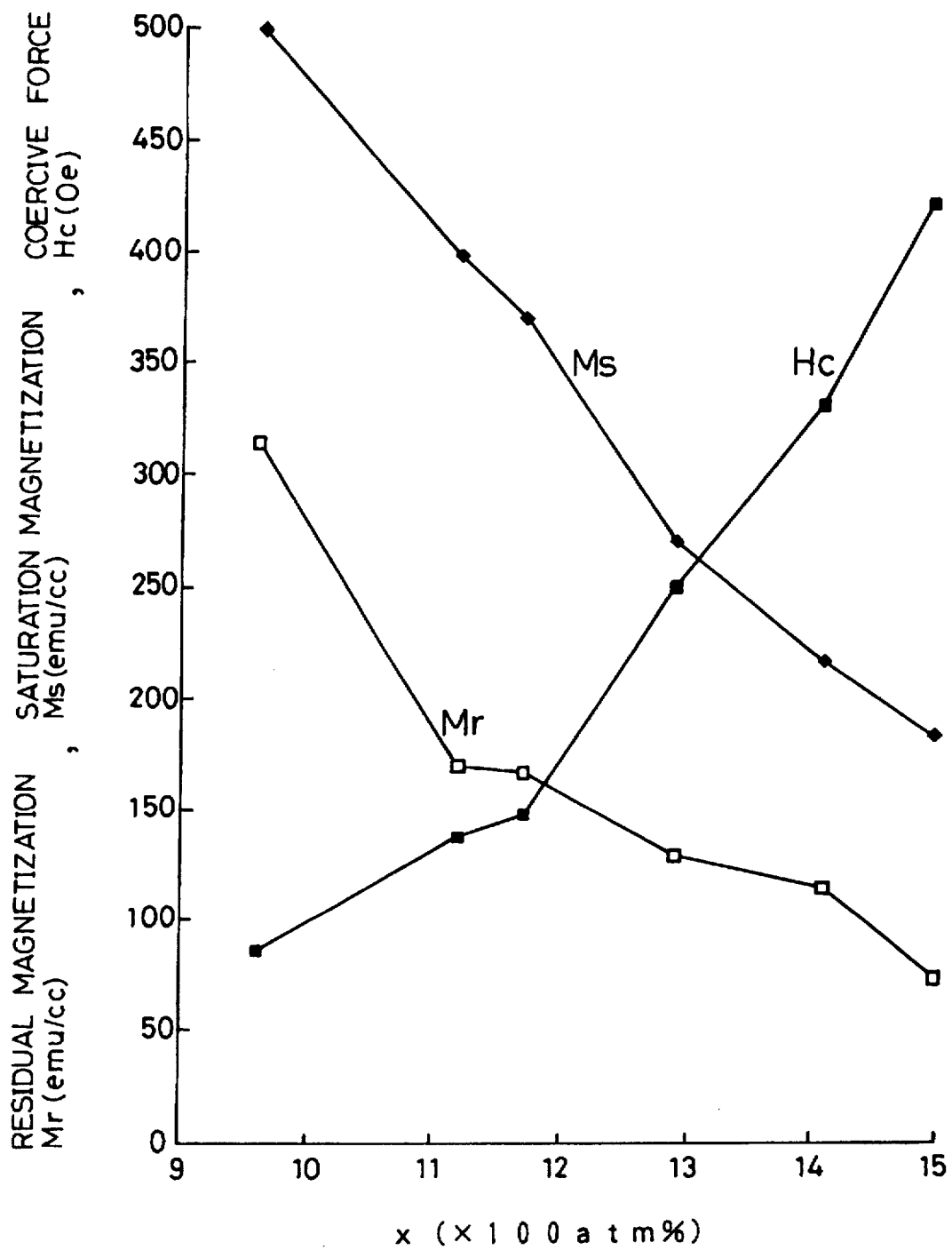
FIG. 4 is a graph showing a change in magnetic properties by Dy composition x in the magnetic latent image holding member of FIG. 1(b) having a structure of [glass substrate/Ti/$Dy_xCo_{(1-x)}$/TiN].

FIG. 2, FIG. 3 and FIG. 4 are graphs respectively showing changes in the saturation magnetization Ms, the residual magnetization Mr and the coercive force Hc by Dy composition x in $Dy_xCo_{(1-x)}$ in the magnetic latent image holding member 6 respectively in the case where the base layer 3 is not formed, the base layer 3(Ta) is formed, and the case where the base layer 3 (Ti) is formed.

Assumed here that the magnetic attraction force required for the thermomagnetic printer is about 20 times of a dead weight of the consumed magnetic toner 10. Then, a product P of the residual magnetization and the medium film thickness computed from the magnetic attraction force of at least around 55 emu·μm/cc would be required. Therefore, as the film thickness of the medium is selected to be 0.7 μm in this preferred embodiment, the residual magnetization of at least 80 emu/cc would be required.

In fact, when recording on a medium having a residual magnetization of less than 80 emu/cc, a toner did not adhere as shown in second or fourth embodiment. For the described reasons, the above-mentioned range of the product P is appropriate. In view of the stability of the recorded information, a larger coercive force is preferable. However, when recording information on a sample having a coercive force of less than 100 Oe thermomagnetically using the magnetic toner 10, the toner adhered to the entire surface of the medium (generally called "greasing"). Namely, as the coercive force of the medium is small, a magnetic domain was formed in an unrecorded area by the effect of the external magnetic field when recording. For this reason, the coercive force of at least 100 Oe is required.

From FIG. 2, FIG. 3 and FIG. 4, in the samples respectively having the structures of [glass substrate/$Dy_xCo_{(1-x)}$/TiN], [glass substrate/Ta/$Dy_xCo_{(1-x)}$/TiN] and [glass substrate/Ti/$Dy_xCo_{(1-x)}$/TiN], when $0.11 \leq x \leq 0.15$, $0.11 \leq x \leq 0.14$ and $0.11 \leq x \leq 0.14$, the above-mentioned numerical value condition is respectively satisfied.

In this preferred embodiment, as Ta and Ti can be formed by the sputtering method, when forming the magnetic latent image holding member 6, the base layer 3 and the magnetic recording layer 4 can be formed successively, thereby achieving an improved manufacturing efficiency of the magnetic latent image holding member 6. This effect can be achieved also from the arrangements of the below-mentioned embodiments.

[EMBODIMENT 2]

To confirm the adaptability of the magnetic recording medium to the thermomagnetic printer, the following experiment was conducted. First, plural kinds of samples having the structure of [glass substrate/$Dy_xCo_{(1-x)}$/protective film] shown in FIG. 1(c) without including the base layer 3 were prepared wherein the magnetic recording layer 4 had a thickness of 0.7 μm and Dy composition x in a range of $0.11 \leq x \leq 0.16$. With regard to these samples, using a thermal element with a line width of 150 μm and a length of about 2 cm, which had a surface temperature of 300° C., a thermal input of 70–120 msec was performed in an external magnetic field of 80–200 Oe to record a magnetic latent image. Then, the magnetic toner was applied thereon. As a result, in any samples, the magnetic toner 10 adhered to the line with a width of 150 μm, and no greasing was observed.

Next, with regard to samples having a coercive force of not more than 100 Oe and having a residual magnetization of less than 80 emu/cc, the latent image recording test and the toner adhering test were conducted in the described manner. As a result, in the former sample, the magnetic toner 10 adhered to the entire surface of the medium, while in the latter sample, the magnetic toner 10 did not adhere to the surface at all.

[EMBODIMENT 3]

To confirm the adaptability of the magnetic recording medium to the thermomagnetic printer, the following experiment was conducted. First, plural kinds of samples having the structure of [glass substrate/Ta/$Dy_xCo_{(1-x)}$/TiN] shown in FIG. 1(b) including the base layer 3 were prepared wherein the magnetic recording layer 4 had a thickness of 0.7 μm and Dy composition with x in a range of $0.11 \leq x \leq 0.14$. With regard to these samples, using a thermal element with a line width of 150 μm and a length of about 2 cm, which had a surface temperature of 300° C., a thermal input of 70–120 msec was performed in an external magnetic field of 80–200 Oe to record a magnetic latent image. Then, the magnetic toner 10 was applied thereon. As a result, in any samples, the magnetic toner 10 adhered to the line with a width of 150 μm, and no greasing was observed.

Next, with regard to samples having a coercive force of not more than 100 Oe and having a residual magnetization of less than 80 emu/cc, the latent image recording test and the toner adhering test were conducted in the described manner. As a result, in the former sample, the magnetic toner 10 adhered to the entire surface of the medium, while in the latter sample, the magnetic toner 10 did not adhere to the surface at all.

[EMBODIMENT 4]

To confirm the adaptability of the magnetic recording medium to the thermomagnetic printer, the following experiment was conducted. First, plural kinds of samples having the structure of [glass substrate/Ti/$Dy_xCo_{(1-x)}$/TiN] shown in FIG. 1(b) including the base layer 3 were prepared wherein the magnetic recording layer 4 had a thickness of 0.7 μm and Dy composition with x in a range of $0.11 \leq x \leq 0.14$. With regard to these samples, using a thermal element with a line width of 150 μm and a length of about 2 cm, which had a surface temperature of 300° C., a thermal input of 70–120 msec was performed in an external magnetic field of 80–200 Oe to record a magnetic latent image. Then, the magnetic toner was applied thereon. As a result, in any samples, the magnetic toner 10 adhered to the line with a width of 150 μm, and no greasing was observed.

Next, with regard to samples having a coercive force of not more than 100 Oe and having a residual magnetization of less than 80 emu/cc, the latent image recording test and the toner adhering test were conducted in the same manner. As a result, in the former sample, the magnetic toner 10 adhered to the entire surface of the medium, while in the latter sample, the magnetic toner 10 did not adhere to the surface at all.

[EMBODIMENT 5]

The following will explain another embodiment of the present invention in reference to FIG. 1, FIG. 5 through FIG. 7.

In this embodiment, magnetic recording layers 4 made of an amorphous alloy thin film with a thickness of 0.7 μm were formed on the following three kinds of samples: one including Ta with a thickness of 0.5 μm and one including Ti with a thickness of 0.4 μm as the base layer 3 formed on the glass substrate 2 (shown in FIG. 1(b), and one including only the glass substrate 2 (shown in FIG. 1(c)). The magnetic recording layer 4 is formed by the high frequency sputtering method using a sample wherein Tb chips are arranged so as to have a predetermined composition on the surface of the Co target without applying a bias magnetic field.

Figure 5:
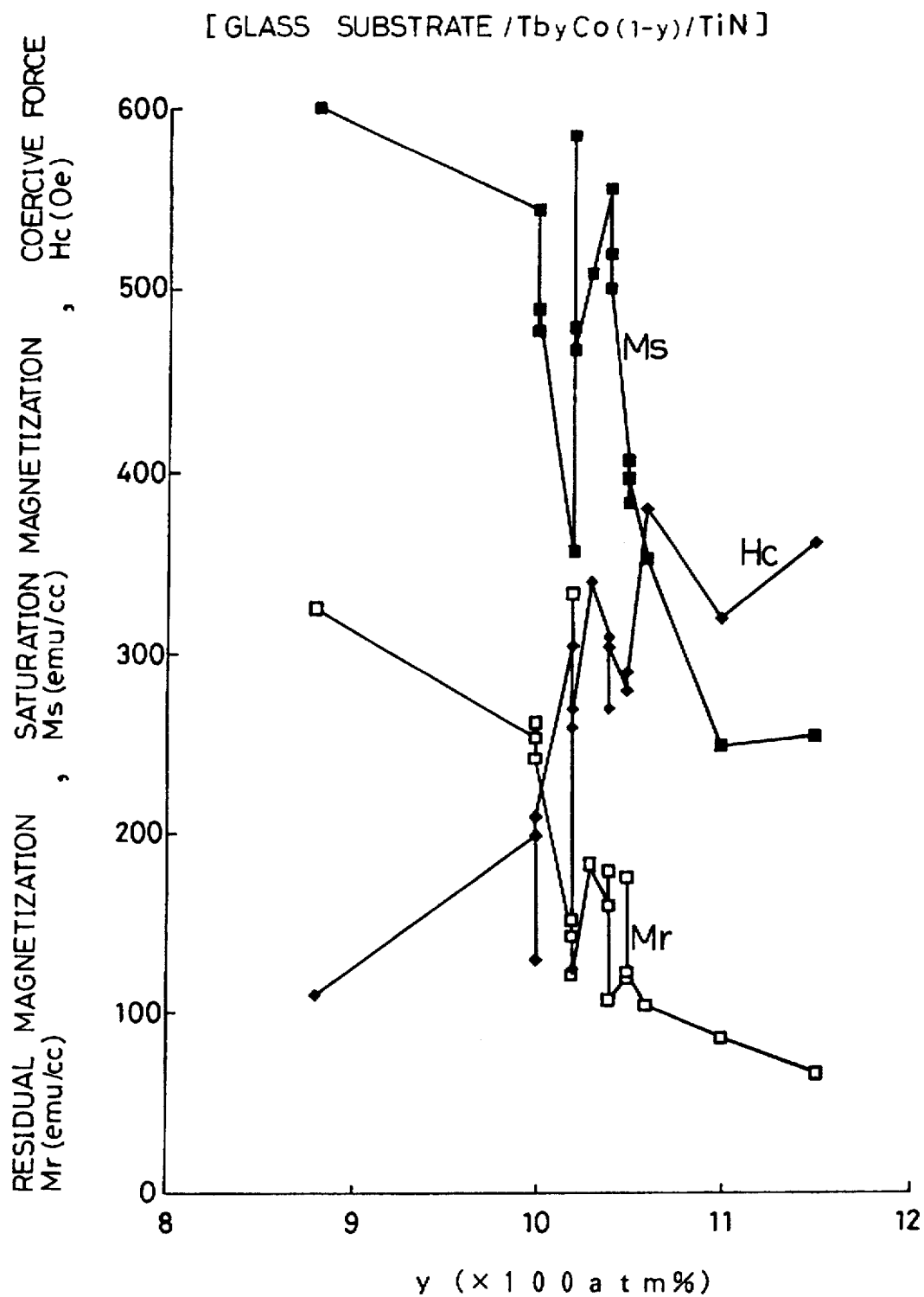
FIG. 5 is a graph showing a change in magnetic properties by Tb composition y in the magnetic latent image holding member of FIG. 1(c) having a structure of [glass substrate/$Tb_yCo_{(1-y)}$/TiN].
Figure 6:
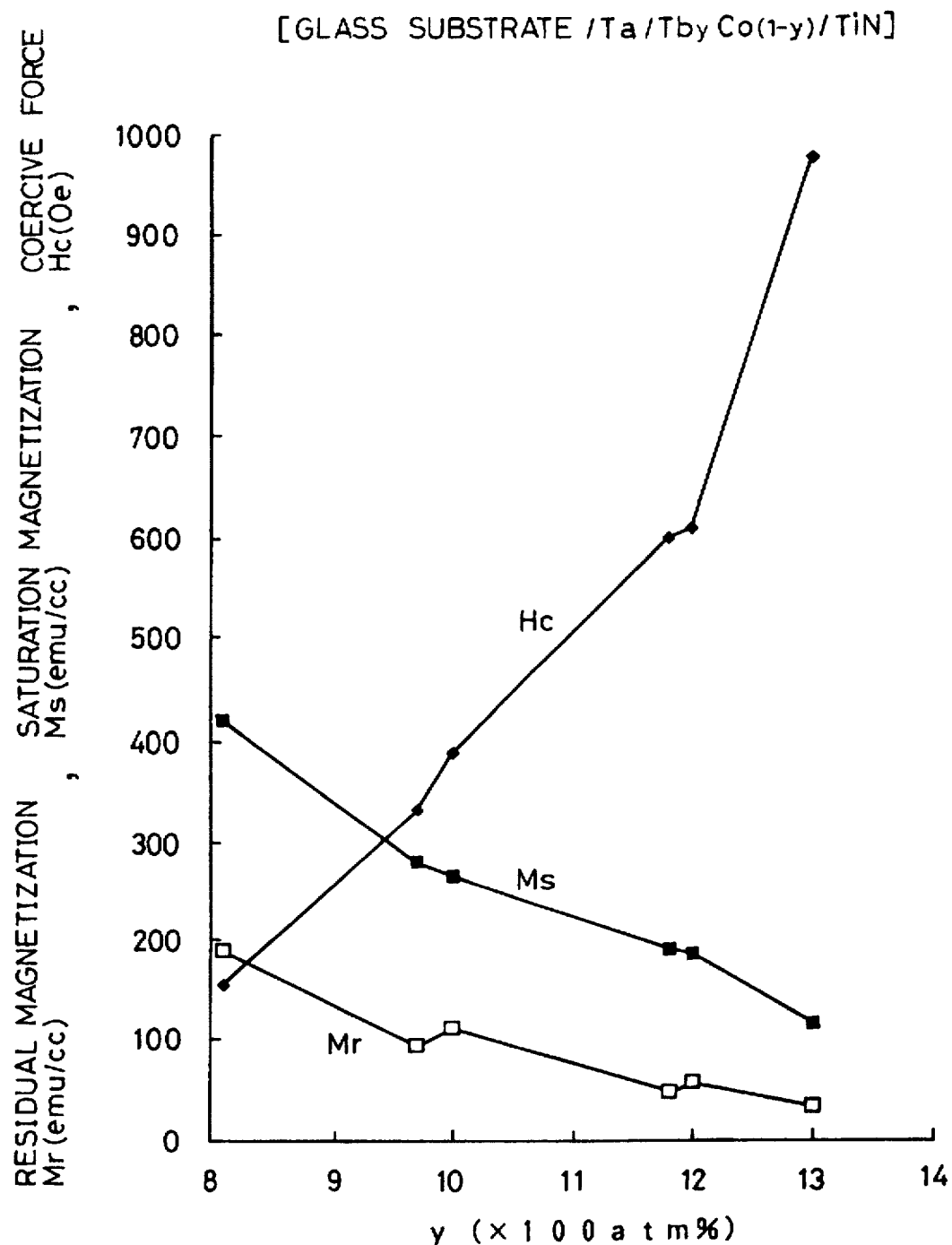
FIG. 6 is a graph showing a change in magnetic properties by Tb composition y in the magnetic latent image holding member of FIG. 1(b) having a structure of [glass substrate/Ta/$Tb_yCo_{(1-y)}$/TiN].
Figure 7:
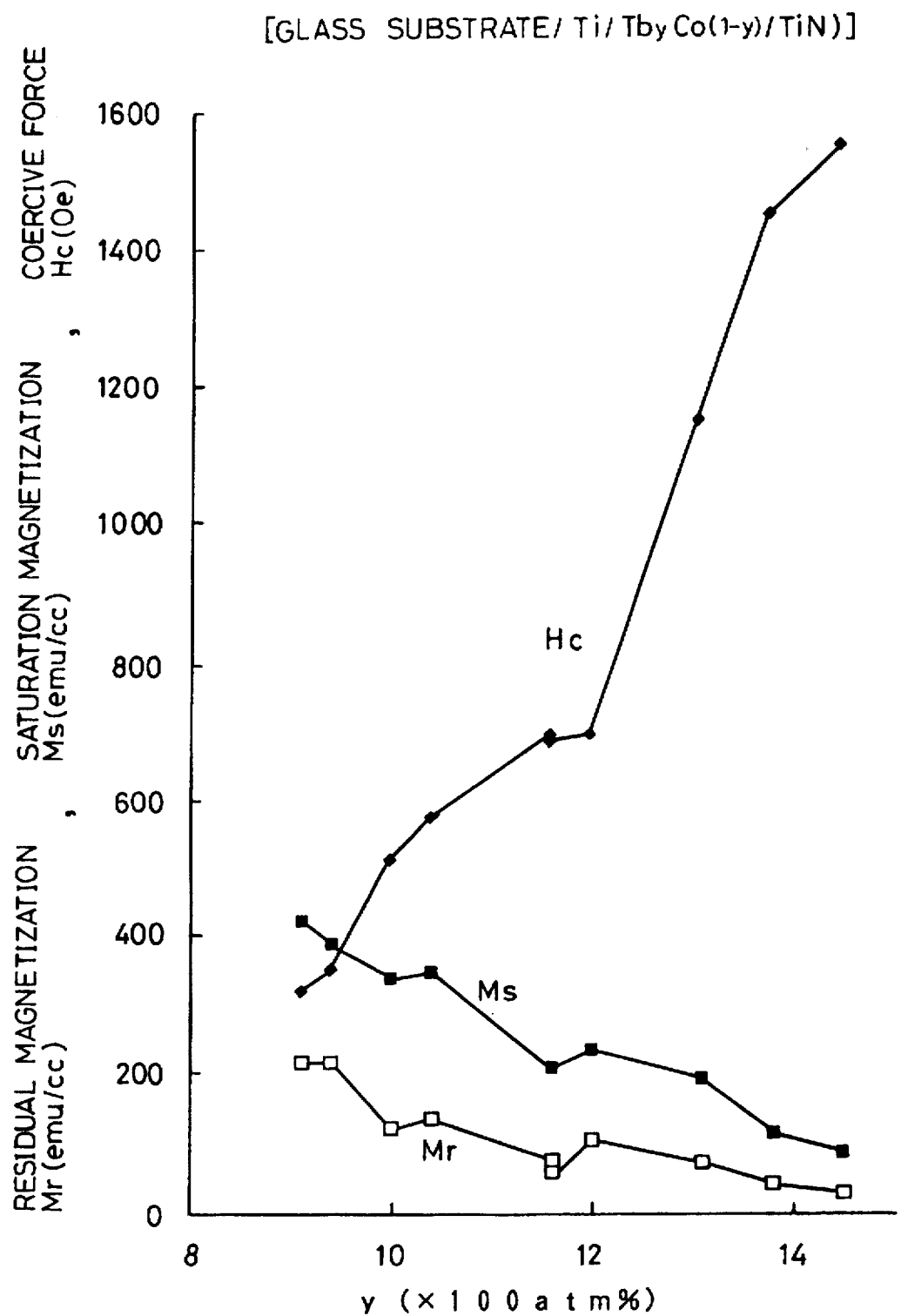
FIG. 7 is a graph showing a change in magnetic properties by Tb composition y in the magnetic latent image holding member of FIG. 1(b) having a structure of [glass substrate/Ti/$Tb_yCo_{(1-y)}$/TiN].

FIG. 5, FIG. 6 and FIG. 7 are graphs respectively showing changes in the saturation magnetization Ms, the residual magnetization Mr and the coercive force Hc of $Tb_{y(1-y)}$ by Tb composition y of $Tb_yCo_{(1-y)}$ formed on the glass substrate 2 via the Ta and Ti.

For the same reason as described in the aforementioned first embodiment, the magnetic attraction force required for the thermomagnetic printer is about 20 times of the dead weight of the consumed magnetic toner 10, and a product P of the residual magnetization and the medium film thickness of at least 55 emu·μm/cc would be required. In the present embodiment, as the medium has a thickness of 0.8 μm is used, the residual magnetization of not less than 70 emu/cc is required. In addition, as in the first embodiment, the coercive force of at least 100 Oe is required.

From FIG. 5, FIG. 6 and FIG. 7, in the samples respectively having the structure of [glass substrate/$Tb_yCo_{(1-y)}$/TiN], [glass substrate/Ta/$Tb_yCo_{(1-y)}$/TiN] and [glass substrate/Ti/$Tb_yCo_{(1-y)}$/TiN], when $0.09 \leq y \leq 0.11$, $0.09 \leq y \leq 0.11$ and $0.09 \leq y \leq 0.13$, the above-mentioned numerical value condition is respectively satisfied.

[EMBODIMENT 6]

To confirm the adaptability of the magnetic recording medium to the thermomagnetic printer, the following experiment was conducted. First, plural kinds of samples having the structure of [glass substrate/$Tb_yCo_{(1-y)}$/protective film] shown in FIG. 1(c) without including the base layer 3 were prepared wherein the magnetic recording layer 4 had a thickness of 0.8 μm and Tb composition y in a range of $0.09 \leq y \leq 0.11$. With regard to these samples, using a thermal element with a line width of 150 μm and a length of about 2 cm, which had a surface temperature of 300° C., a thermal input of 70–120 msec was performed in an external magnetic field of 80–250 Oe to record a magnetic latent image. Then, the magnetic toner 10 was applied thereon. As a result, in any samples, the magnetic toner 10 adhered to the line with a width of 150 μm, and no greasing was observed.

Next, with regard to a sample having a residual magnetization of less than 70 emu/cc, the latent image recording test and the toner adhering test were conducted in the described manner. As a result, the magnetic toner 10 did not adhere to the surface at all.

[EMBODIMENT 7]

To confirm the adaptability of the magnetic recording medium to the thermomagnetic printer, the following experiment was conducted. First, plural kinds of samples having the structure of [glass substrate/Ta/$Tb_yCo_{(1-y)}$/TiN] shown in FIG. 1(b) including the base layer 3 were prepared wherein the magnetic recording layer 4 had a thickness of 0.8 μm and Tb composition y of $0.09 \leq y \leq 0.11$. With regard to these samples, using a thermal element with a line width of 150 μm and a length of about 2 cm, which had a surface temperature of 300° C., a thermal input of 70–120 msec was performed in an external magnetic field of 80–250 Oe to record a magnetic latent image. Then, the magnetic toner 10 was applied thereon. As a result, in any samples, the magnetic toner 10 adhered to the line with a width of 150 μm, and no greasing was observed on the base.

Next, with regard to a sample having a residual magnetization of less than 70 emu/cc, the latent image recording test and the toner adhering test were conducted in the described manner. As a result, the toner did not adhere to the surface at all.

[EMBODIMENT 8]

To confirm the adaptability of the magnetic recording medium to the thermomagnetic printer, the following experiment was conducted. First, plural kinds of samples having a structure of [glass substrate/Ti/$Tb_yCo_{(1-y)}$/TiN] shown in FIG. 1(b) including the base layer 3 were prepared wherein the magnetic recording layer 4 had a thickness of 0.8 μm and Tb composition y in a range of $0.09 \leq y \leq 0.11$. With regard to these samples, using a thermal element with a line width of 150 μm and a length of about 2 cm, which had a surface temperature of 300° C., a thermal input of 70–120 msec was performed in an external magnetic field of 80–250 Oe to record a magnetic latent image. Then, the magnetic toner 10 was applied thereon. As a result, in any samples, the magnetic toner 10 adhered to the line with a width of 150 μm, and no greasing was observed.

Next, with regard to a sample having a residual magnetization of less than 70 emu/cc, the latent image recording test and magnetic toner adhering test were conducted in the described manner. As a result, the magnetic toner 10 did not adhere to the surface at all.

[EMBODIMENT 9]

Figure 8:
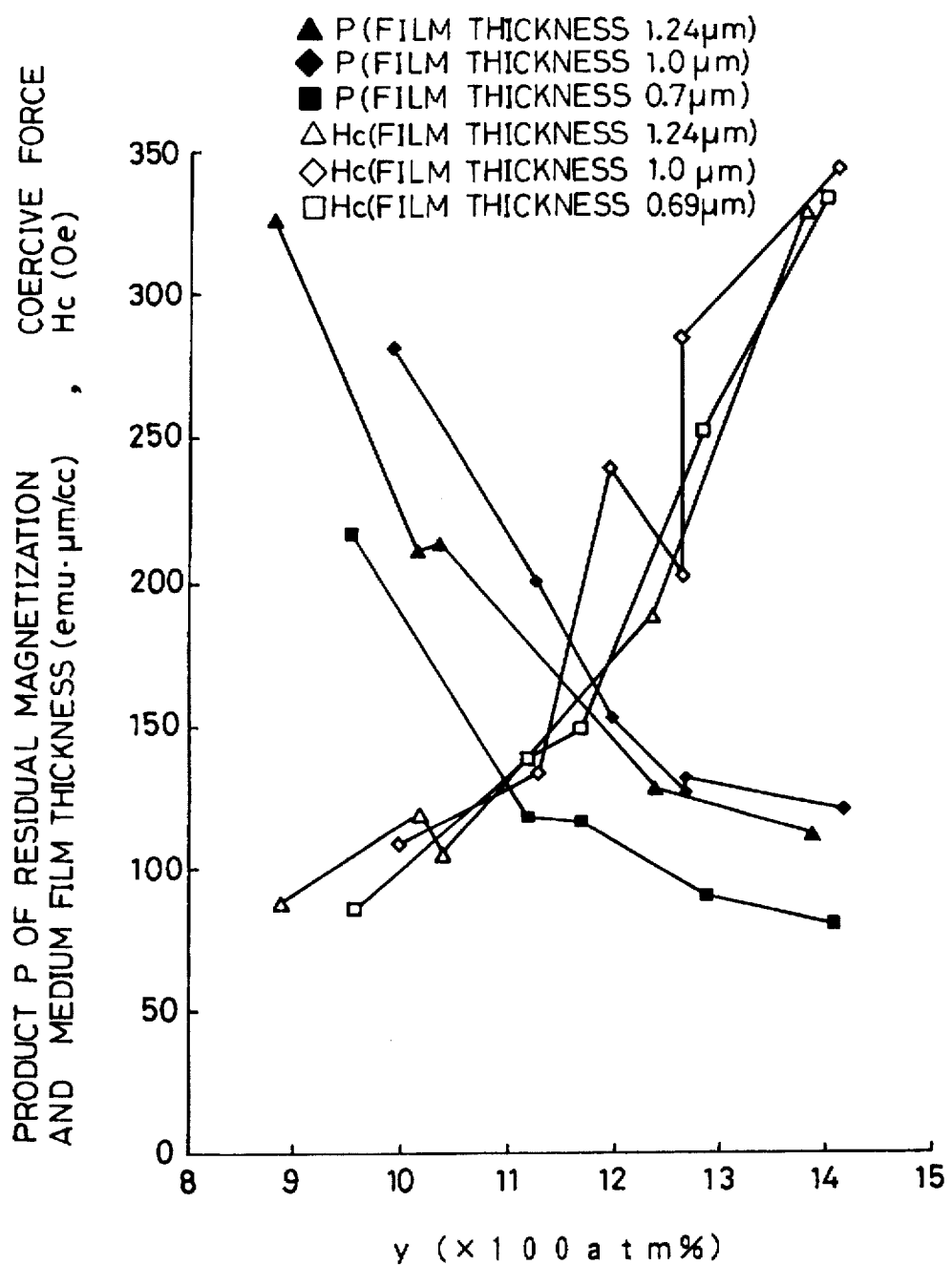
FIG. 8 shows film thickness dependencies of a magnetic recording medium of a product P of the residual magnetization and the film thickness of the medium and the coercive force Hc of the magnetic latent image holding member of FIG. 1(b) having a structure of [glass substrate/Ti/$Dy_xCo_{(1-x)}$/TiN].

The following descriptions will discuss another embodiment of the present invention in reference to FIG. 1, FIG. 8 and FIG. 12.

In this embodiment, three samples having the arrangement of FIG. 1(b) were used wherein on a Ti with a thickness of 0.4 μm formed on the glass substrate 2, magnetic recording layers 4 with thickness of 0.7 μm, 1.0 μm and 1.24 μm were respectively formed by the sputtering method using a target having Dy chips arranged so as to have a predetermined Dy composition on the surface of the Co target.

FIG. 8 is a graph showing a Dy composition dependency of a product P(emu·μm/cc) of the residual magnetization and the medium film thickness and a coercive force Hc(Oe) using a medium film thickness as a parameter.

From FIG. 8, the medium having the structure where the base layer 3 made of Ti was formed between the glass substrate 2 and the magnetic recording layer 4 did not show changes in the coercive force Hc very much even when the magnetic recording layer 4 was made thicker, as compared to the medium wherein the magnetic recording layer 4 is formed directly on the glass substrate 2. In addition, it could be seen from the figure that such medium showed the maximum value for the product P with respect to the film thickness of the magnetic recording layer 4.

The described variation in the product P indicates that the residual magnetization is maintained constant even if the medium of the magnetic recording layer 4 is made thicker, or the degree of reduction in the residual magnetization can be suppressed if occurred.

As described, by forming Ti as the base layer 3 between the glass substrate 2 and the magnetic recording layer 4, the reduced amount of the residual magnetization occurs as the magnetic recording medium is made thicker can be suppressed, and the magnetic attraction force can be increased.

In the thermomagnetic printer shown in FIG. 12, using the magnetic latent image holding member 6 having the magnetic recording layer 4 made of DyCo film with a thickness of 1.0 μm having a Dy composition x of 0.1 shown in FIG. 1(a), the magnetic attraction force was measured. As a result, such a large magnetic attraction force of about 150 times of the dead weight of the magnetic toner 10 was obtained.

[EMBODIMENT 10]

In this embodiment, the experiment was conducted with regard to samples having the same arrangements as those used in ninth embodiment except that Ta with a thickness of 0.5 μm was used as the base layer 3.

As a result, as in the seventh embodiment, even when the magnetic recording medium was made thicker, the coercive force Hc did not change much, and the curve having a maximum value for the product P was obtained.

In the described arrangement, the reduced amount of the residual magnetization occurred as the magnetic recording layer 4 was made thicker was reduced. Therefore, by making the film thicker by adopting the described magnetic recording medium to the thermomagnetic printer shown in FIG. 11, a large magnetic attraction force of around 100 times of the dead weight of the magnetic toner 10 was obtained.

[EMBODIMENT 11]

Figure 9:
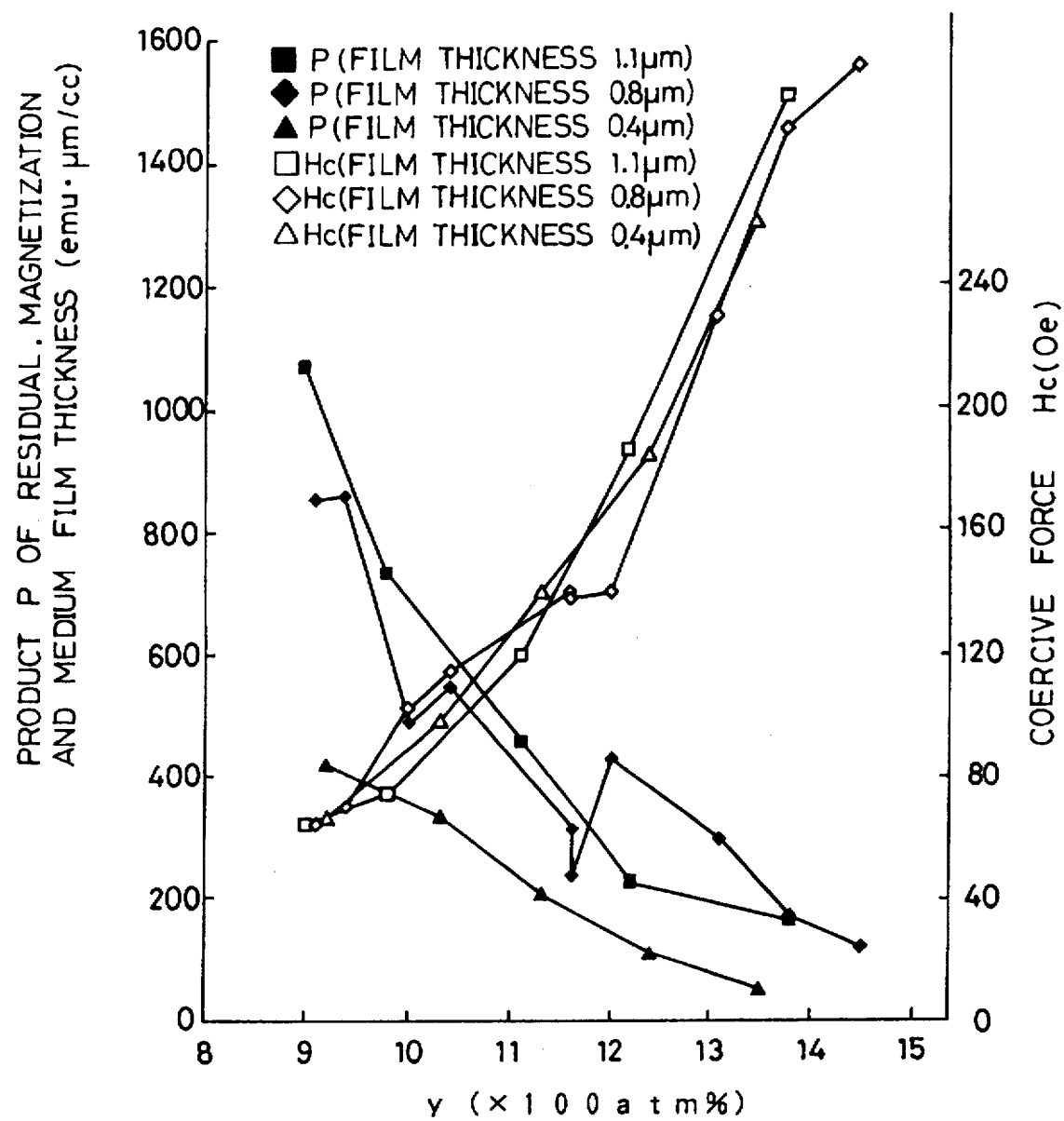
FIG. 9 shows film thickness dependencies of a magnetic recording medium of a product P of the residual magnetization and the film thickness of the medium and the coercive force Hc of the magnetic latent image holding member of FIG. 1(b) having the structure of [glass substrate/Ti/$Tb_yCo_{(1-y)}$/TiN].
Figure 10:
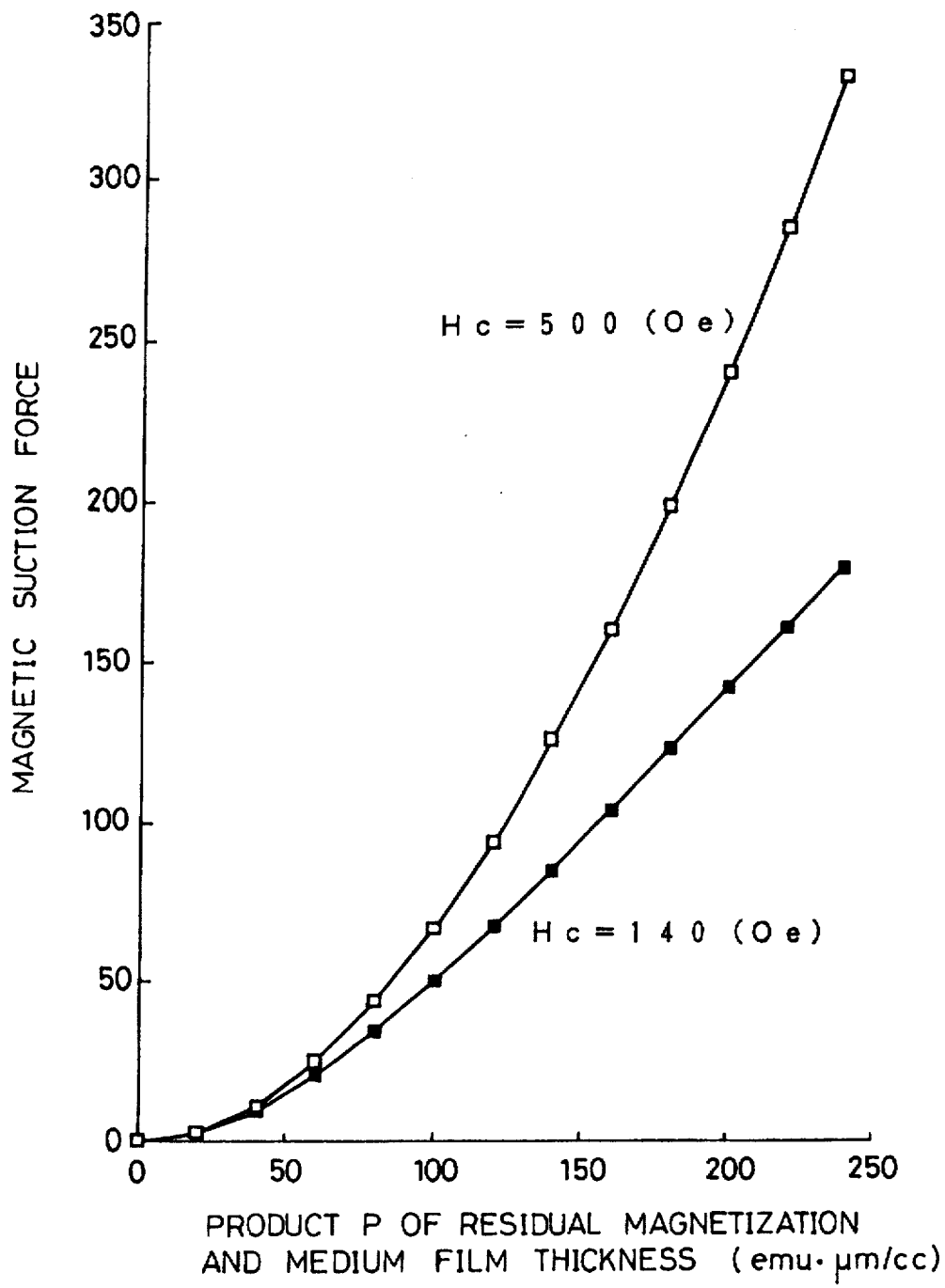
FIG. 10 is a graph showing a correlation between a product P of the residual magnetization and the medium film thickness and the magnetic attraction force (the vertical axis in the graph shows the magnetic attraction force by indicating the magnetic attraction force is how many times of the dead weight of a magnetic toner having an average diameter of 12 μm and a density of 2.1 kg/cm$^3$).
Figure 11:
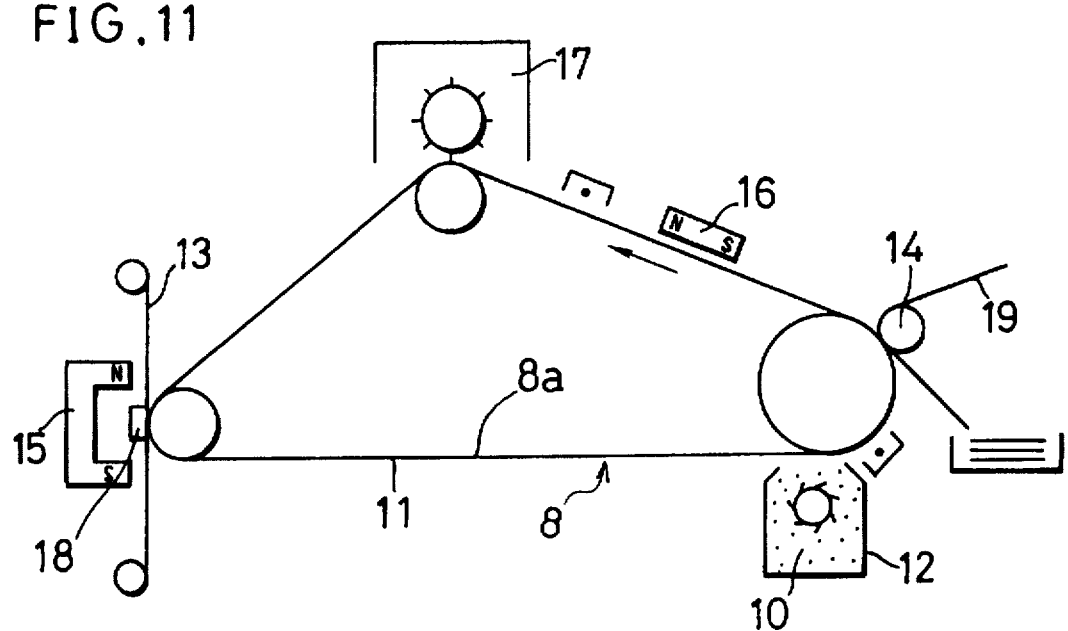
FIG. 11 is a typical depiction showing a schematic configuration of a thermomagnetic printer used in common in conventional examples and embodiments of the present invention.

The following descriptions will discuss another embodiment of the present invention in reference to FIG. 1, FIG. 9 and FIG. 11.

In this embodiment, first three samples having the structure of FIG. 1(b) were prepared wherein on a Ti with a thickness of 0.4 μm formed on the glass substrate 2 as the base layer 3, magnetic recording layers 4 with thickness of 0.4 μm, 0.8 μm and 1.1 μm were respectively formed by the sputtering method using a target having Tb chips arranged so as to have a predetermined Tb composition on the surface of the Co target.

FIG. 9 is a graph showing a Dy composition dependency of a product P(emu·μm/cc) of the residual magnetization and the medium film thickness and a coercive force Hc(Oe) of the samples using a medium film thickness as a parameter.

From FIG. 9, the medium having the structure where the base layer 3 made of Ti was formed between the glass substrate 2 and the magnetic recording layer 4 did not show changes in the coercive force Hc very much even when the magnetic recording layer 4 was made thicker, as compared to the medium wherein the magnetic recording layer 4 was formed directly on the glass substrate 2. In addition, it could be seen from the figure that such medium showed the maximum value for the product P with respect to the film thickness of the magnetic recording layer 4.

The described variation in the product P indicates that the residual magnetization is maintained constant even if the medium of the magnetic recording layer 4 is made thicker, or the degree of reduction in the residual magnetization can be suppressed if occurred.

As described, by forming Ti as the base layer 3 between the glass substrate 2 and the magnetic recording layer 4, the reduced amount of the residual magnetization occurs as the magnetic recording medium is made thicker can be suppressed, and the magnetic attraction force can be increased.

In the thermomagnetic printer shown in FIG. 11, using the magnetic latent image holding member 6 having the magnetic recording layer 4 made of DyCo film with a thickness of 1.1 μm having a Tb composition y of 0.09 shown in FIG. 1(a), the magnetic attraction force was measured. As a result, such a large magnetic attraction force of about 100 times of the dead weight magnetic toner 10 was obtained.

[EMBODIMENT 12]

In this embodiment, the experiment was conducted with regard to samples having the same arrangements as those used in eleventh embodiment except that Ta with a thickness of 0.5 μm was used as the base layer 3.

As a result, as in ninth embodiment, even when the magnetic recording medium was made thicker, the coercive force Hc did not change much, and the product P was increased as the film was made thicker.

In the described arrangement, the reduced amount of reduction in the residual magnetization occurs as the magnetic recording layer 4 is made thicker can be reduced. Therefore, by making the film thicker by adopting the described magnetic recording medium to the thermomagnetic printer shown in FIG. 11, a large magnetic attraction force of around 100 times of the dead weight of the magnetic toner 10 can be obtained.

[COMPARATIVE EXAMPLE 1]

In this comparative example, two samples having the structure of FIG. 1(c) were prepared, wherein directly on the glass substrate 2, magnetic recording layers 4 with thicknesses of 0.7 μm and 1.0 μm were respectively formed by the sputtering method using a target having Dy chips arranged so as to have a predetermined Dy composition on the surface of a Co target.

Then, the film thickness dependency of the product P (emu·μm/cc) of the residual magnetization and the medium film thickness and the coercive force Hc (Oe) was measured. As a result, even when the film of the medium was made thicker, the coercive force Hc stayed around 140 (Oe), and the product P stayed around 70 (emu·μm/cc).

The value of the product P did not change much because the value of the residual magnetization was significantly reduced as the thickness of the magnetic recording medium increased.

[COMPARATIVE EXAMPLE 2]

In this comparative example, two samples having the structure of FIG. 1(c) were prepared wherein directly on the glass substrate 2, magnetic recording layers 4 with thickness of 0.7 μm and 1.0 μm were respectively formed by the sputtering method using a target having Tb chips arranged so as to have a predetermined Tb composition on the surface of the Co target.

Then, the film thickness dependency of the product P (emu·μm/cc) of the residual magnetization and the medium film thickness and the coercive force Hc (Oe) was measured. As a result, even with the thicker medium, the coercive force Hc stayed around 340 (Oe), and the product P stayed around 50 (emu·μm/cc).

The value of the product P did not change much because the value of the residual magnetization was significantly reduced as the thickness of the magnetic recording medium increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermomagnetic printing device, comprising:

a magnetic recording medium for recording thereon a magnetic latent image made of an amorphous alloy thin film of a formula $Dy_xCo_{(1-x)}$, wherein $0.11 \leq x \leq 0.14$;

a base having said magnetic recording medium formed on a surface thereof; and a base layer consisting of a Ta layer, formed between said base and said magnetic recording medium.

2. The thermomagnetic printing device as set forth in claim 1, wherein:

said base layer has a film thickness in a range of 0.1 μm and 1.0 μm.

3. The thermomagnetic printing device as set forth in claim 1 wherein:

said magnetic recording medium has a thickness in a range of from 0.5 μm to 2 μm.

4. A thermomagnetic printing device, comprising:

a magnetic recording medium for recording thereon a magnetic latent image made of an amorphous alloy thin film of a formula $Dy_xCo_{(1-x)}$, wherein $0.11 \leq x \leq 0.14$;

a base having said magnetic recording medium formed on a surface thereof; and a base layer consisting of a Ti layer, formed between said base and said magnetic recording medium.

5. The thermomagnetic printing device as set forth in claim 4, wherein:

said base layer has a film thickness in a range of 0.1 μm and 1.0 μm.

6. The thermomagnetic printing device as set forth in claim 4, wherein:

said magnetic recording medium has a thickness in a range of from 0.5 μm to 2 μm.

7. A thermomagnetic printing device, comprising:

a magnetic recording medium for recording thereon a magnetic latent image made of an amorphous alloy thin film of a formula $Tb_yCo_{(1-y)}$, wherein $0.09 \leq y \leq 0.13$;

a base having said magnetic recording medium formed on a surface thereof; and a base layer consisting of a Ta layer, formed between said base, and said magnetic recording medium.

8. The thermomagnetic printing device as set forth in claim 7, wherein:

said base layer has a film thickness in a range of 0.1 μm and 1.0 μm.

9. The thermomagnetic printing device as set forth in claim 7, wherein:

said magnetic recording medium has a thickness in a range of from 0.5 μm to 2 μm.

10. A thermomagnetic printing device, comprising:

a magnetic recording medium for recording thereon a magnetic latent image made of an amorphous alloy thin film of a formula $Tb_yCo_{(1-y)}$, wherein $0.09 \leq y \leq 0.13$;

a base having said magnetic recording medium formed on a surface thereof; and a base layer consisting of a Ti layer, formed between said base and said magnetic recording medium.

11. The thermomagnetic printing device as set forth in claim 10, wherein:

said base layer has a film thickness in a range of 0.1 μm and 1.0 μm.

12. The thermomagnetic printing device as set forth in claim 10, wherein:

said magnetic recording medium has a thickness in a range of from 0.5 μm to 2 μm.

* * * * *